United States Patent [19]
Nakano et al.
[11] 4,308,314
[45] Dec. 29, 1981

[54] ELECTRIC RECORDING MATERIAL

[75] Inventors: Shiro Nakano, Suita; Yoshiro Naito, Nara; Shigeki Nakamura, Osaka; Tosimasa Ikena, Kusatsu; Kazuo Tanaka, Osaka, all of Japan

[73] Assignee: Sekisui Kagaku Kogyo Kabushiki Kaisha, Osaka, Japan

[21] Appl. No.: 62,576

[22] Filed: Jul. 31, 1979

[30] Foreign Application Priority Data

| | | | |
|---|---|---|---|
| Aug. 4, 1978 | [JP] | Japan | 53-95547 |
| Dec. 25, 1978 | [JP] | Japan | 53-164256 |
| Jan. 12, 1979 | [JP] | Japan | 54-3300 |

[51] Int. Cl.$^3$ ...................... B41M 5/24; G01D 15/06; G32B 5/16

[52] U.S. Cl. .................................... 428/323; 346/151; 346/135.1; 427/121; 428/328; 428/336; 428/339; 428/409; 428/913

[58] Field of Search ............ 346/151, 162, 163, 135.1; 428/328, 323, 469, 913, 914, 336, 339, 409, 461; 427/121

[56] References Cited

U.S. PATENT DOCUMENTS 4,163,075 7/1979 Nakano et al. ...................... 428/323

*Primary Examiner*—Bruce H. Hess

*Attorney, Agent, or Firm*—Wenderoth, Lind & Ponack

[57] ABSTRACT

An electric recording material comprising (A) a semiconductive resin layer comprising a resin matrix and a conductivity-imparting agent dispersed therein and having a surface resistance of more than 1 ohm to less than $10^5$ ohms, (B) a metal-containing resin layer comprising a resin matrix and 5 to 60% by volume of a metal powder dispersed therein and having a surface resistance of $10^5$ to $10^{16}$ ohms, said metal-containing layer being laminated to one surface of said semiconductive resin layer (A), (C) an electrically conductive covering layer having a surface resistance not exceeding $10^4$ ohms and being lower than that of the semiconductive resin layer (A), said covering layer being laminated to the other surface of said resin layer (A), and (D) optionally, a protective covering resin layer having a higher surface resistance than that of said covering layer (C) and a thickness of not more than 10 microns, said protective covering layer being laminated to said conductive covering layer (C);

and a method for electric recording using said material. The use of said material permits recording at low voltages.

22 Claims, No Drawings

ELECTRIC RECORDING MATERIAL

This invention relates to a novel and improved electric recording material, and more specifically, to an electric recording material which permits recording at low voltages, and to a method for electric recording using said material.

With abounding information in recent years, there has been an increased need for rapid transmission, recording, etc. of information, and various information control systems such as information processing systems, information transmission systems and information recording systems have been developed. An electric discharge recording system is one typical example.

The electric discharge recording system is a process which comprises applying an electrical signal of several hundred volts and several watts in the form of an electric voltage, and breaking a semiconductive recording layer on the surface of a recording layer by electric discharge, thereby to form an image on the recording layer or on a substrate superimposed on the recording layer. This process is a "direct imaging" process which does not require processing operations such as development and fixation, and is in widespread use as a simple recording process. For example, the process find applications in facsimile systems, various measuring instruments, recording meters, record displays in computers, and processing of electrostencil master sheets.

In the electric discharge recording, a discharge recording stylus is directly contacted with the recording surface of an electric discharge recording material. Discharging is performed through the stylus to break the recording layer, and to form an image on the recording surface. The electric discharge breakdown of the electric discharge recording material, however, causes the issuance of an offensive odor, the generation of soot, or scattering of a coloring substance such as carbon black dispersed in the recording layer.

The soot and carbon black will contaminate the recording material, or adhere to the discharge stylus to affect its accurate electric discharging. Consequently, this will reduce the reliability of recording. Furthermore, since the discharge recording stylus makes direct contact with the surface of the recording material for scanning, the injuries caused by the scanning track of the recording stylus remain on the surface of the recording material and its natural appearance is impaired.

In an attempt to remove such defects, there have been suggested a method involving the provision of a dust-collecting jacket around the tip of the discharge recording stylus as disclosed in Japanese Utility Model Publication No. 9851/65, and a method which uses a device for polishing and cleaning the discharge recording stylus as disclosed in Japanese Utility Model Publication No. 9850/65. These methods, however, cannot completely prevent the adhesion of soot, carbon black, etc. to the discharge recording stylus, and the maintenance of the devices is troublesome. A method was also suggested which involves the provision of a gas releasing device equipped with a filter containing a deodorant in an electric discharge recording device in order to remove the offensive odor. It is practically impossible in this method to remove the offensive odor completely, and the gas releasing device is costly.

As an electric recording material free from the aforesaid defects, S. Nakano and one other, who constitute part of the inventorship of the present invention, previously suggested a composite electric discharge recording material comprising (i) a semiconductive resin layer capable of being broken by electric discharging which has a surface resistance of $10^5$ to $10^{16}$ ohms and a volume resistance of $10^3$ to $10^{14}$ ohms-cm;

(ii) a metal-containing resin layer having a surface resistance of at least $10^8$ ohms and a volume resistance of not more than $10^4$ ohms-cm, which is laminated on one surface of the semiconductive resin layer (i) and is prepared by dispersing a metal powder in a resin matrix; and (iii) a conductive layer having a surface resistance of not more than $10^4$ ohms and a volume resistance of not more than $10^2$ ohms-cm, which is laminated on the other surface of the semiconductive resin layer (i) (see British patent specification No. 1,545,726).

The previously suggested electric recording material, however, is of the type which permits discharge recording at relatively high voltages in the range of from 100 to 600 V. To perform information control with a high efficiency, it has been increasingly desired in recent years to develop a multi-stylus discharge recording system adapted for recording at high speed by means of a plurality of discharge recording styluses. When the conventional electric recording material which requires high voltages in image formation is directly applied to the multi-stylus discharge recording system and a high voltage required for discharge recording is applied to a plurality of closely aligned discharge recording styluses, discharge takes place among the styluses before the recording layer of the recording material is broken by discharging. This is a serious defect because the desired discharge recording fails.

On the other hand, when in a discharge recording system having a single discharge stylus, the speed of scanning of the recording stylus is increased in an attempt to increase the speed of recording, too much load is exerted on the drive section of the recording stylus, and may cause a trouble in the discharge recording device.

Accordingly, it has been strongly desired to develop a discharge recording material which permits discharge recording at low voltages.

One object of this invention is to provide an electric recording material which permits discharge recording at much lower voltages than conventional discharge recording materials.

Another object of this invention is to provide an electrical recording material which gives clear, natural and soft recorded images, and which can be applied to a multi-stylus electric recording system.

Still another object of this invention is to provide an electric recording material which permits recording at low voltages to give clear, natural and soft recorded images without troubles such as the contamination of the recording material itself or the electric recording device by the scattering of soot or coloring materials such as carbon black, or the decrease of the accuracy of electric recording caused by the adhesion of soot or coloring materials such as carbon black to the electric recording stylus.

A further object of this invention is to provide a method for performing electric recording at low voltages using such electrical recording materials.

Other objects and advantages of this invention will become apparent from the following description.

According to this invention, there is provided an electric recording material comprising (A) a semiconductive resin layer comprising a resin matrix and a conductivity-imparting agent dispersed therein and having a surface resistance of more than 1 ohm to less than $10^5$ ohms, (B) a metal-containing resin layer comprising a resin matrix and 5 to 60% by volume of a metal powder dispersed therein and having a surface resistance of $10^5$ to $10^{16}$ ohms, said metal-containing layer being laminated to one surface of said semiconductive resin layer (A), (C) an electrically conductive covering layer having a surface resistance not exceeding $10^4$ ohms and being lower than that of the semiconductive resin layer (A), said covering layer being laminated to the other surface of said resin layer (A), and (D) optionally, a protective covering resin layer having a higher surface resistance than that of said covering layer (C) and a thickness of not more than 10 microns, said protective covering layer being laminated to said conductive covering layer (C).

The electric recording material of this invention is a three-layer or four-layer composite electric recording material including the metal-containing resin layer (B), the semiconductive resin layer (A), the conductive covering layer (C), and optionally the protective covering resin layer (D) laminated in this order.

The structure of each of these layers is described in greater detail hereinbelow.

Metal-containing resin layer (B)

This metal-containing resin layer can be produced by dispersing a metal powder in a resin matrix.

Any metal powder can be used which is electrically conductive and stable. Suitable metal powders are well conductive metal powders having a specific resistance of not more than $2\times10^{-4}$ ohm-cm, preferably not more than $2\times10^{-5}$ ohm-cm.

The metal powders include not only powders of metallic elements, but also powders of alloys of two or more metals and of products obtained by coating highly conductive metals with metal powders having low conductivity. Examples of suitable metal powders are metal elements such as copper, aluminum, tin, molybdenum, silver, iron, nickel and zinc, alloys of at least two metal elements such as stainless steel, brass and bronze, and a copper powder coated with silver. Of these, copper, aluminum, iron, zinc, and silver-coated copper powder are preferred. Copper, aluminum and zinc are most advantageous. The metal powders may be used alone or as mixtures of two or more.

The metal-containing resin is a non-recording layer which does not undergo discharge breakage at the time of using the electric recording material of this invention for electric recording. It has been found that the particle diameter of the metal powder is one of the especially important factors for obtaining such a layer. The suitable average particle diameter of the metal powder is 0.2 to 20 microns, preferably 0.5 to 10 microns, more preferably 1 to 6 microns.

The individual particles of the metal powder are generally preferably in the form of microspheres, dendrites or microlumps. Scale-like or needle-like particles well used in the field of paints can also be used in the present invention, but powders in these shapes are desirably used in combination with the microspherical, dendriform or microlumpy metal powders. From the standpoint of the method of powderization, electrolytic metal powders, pulverized electrolytic metal powders, stamp-milled metal powders, and reduced metal powders are advantageous.

It has been found quite unexpectedly that when a metal powder having the particle diameter and shape described above is dispersed in a resin and formed into a sheet for example, there is a marked difference in electric conductivity between the thickness direction of the sheet and a direction at right angles to the thickness direction, and the sheet has electric anisotropy and is very suitable as a covering sheet for electric discharge recording materials.

It is desirable that a metal-containing resin layer prepared by dispersing the metal powder in a resin matrix has a surface resistance ranging from $10^5$ to $10^{16}$ ohms, preferably $10^9$ to $10^{14}$ ohms, more preferably $5\times10^9$ to $5\times10^{12}$ ohms, and a volume resistance of not more than $10^4$ ohms-cm, preferably 1 to $10^4$ ohms-cm, more preferably $10^2$ to $10^3$ ohms-cm.

In the present application, the "surface resistance" is defined in "5.3" under "Definitions" at page 93 of ASTM designation: D-257 (reapproved 1972), and it is measured by the device shown in FIG. 2 at page 102.

The "volume resistance" is defined in "5.2" under "Definitions" at page 93 of ASTM designation: D-257, and it is measured by the device shown in FIG. 4 at page 104.

The metal powder can be dispersed in a resin in an amount which makes it possible for the resulting metal-containing resin to have the above-specified surface resistance and volume resistance. The amount of the metal powder can therefore be varied widely according to the type, particle diameter, shape, etc. of the metal. It is very desirable, however, that the total amount of the metal powder be generally 5 to 60% by volume, preferably 5 to 20% by volume, more preferably 10 to 15% by volume, of the metal-containing resin layer. The weight ratio between the metal powder and the resin matrix is generally such that the amount of the metal powder is at least 20 parts by weight, preferably 30 to 2,000 parts by weight, more preferably 40 to 1,000 parts by weight, per 100 parts by weight of the resin.

The resin which constitutes the resin matrix in which the metal powder is dispersed may be any thermoplastic or thermosetting resin which has film-forming ability and electrical insulation (generally having a volume resistance of at least $10^7$ ohms-cm). Generally, the matrix resin preferably has great ability to bind the metal powder and other additives and can be formed into sheets or films having high mechanical strength, flexibility and stiffness.

Examples of suitable resins that can be used in this invention are thermoplastic resins such as polyolefins (e.g., polyethylene or polypropylene), polyvinyl chloride, polyvinyl acetal, cellulose acetate, polyvinyl acetate, an ethylene/vinyl acetate copolymer, a vinyl chloride/vinyl acetate copolymer, polystyrene, polyalkyl acrylates such as polymethyl acrylate, polyalkyl methacrylates such as polymethyl methacrylate, polyacrylonitrile, thermoplastic polyesters, polyvinyl alcohol, carboxymethyl cellulose, and gelatin; and thermosetting resins such as thermosetting polyesters, epoxy resins and melamine resins. The thermoplastic resins are preferred, and polyethylene, polypropylene, polyvinyl chloride, ethylene/vinyl chloride copolymer, polyvinyl acetal, cellulose acetate, thermoplastic polyesters, polyvinyl chloride and vinyl chloride/vinyl acetate copolymer are especially preferred.

As is conventional in the art, additives such as plasticizers, fillers, lubricants, stabilizers, antioxidants, fire retardants and mold releasing agents may be added as needed to the resin in order to improve its moldability, storage stability, plasticity, tackiness, lubricity, fire retardancy, etc.

Examples of the plasticizers are dioctyl phthalate, dibutyl phthalate, dicapryl phthalate, dioctyl adipate, diisobutyl adipate, triethylene glycol di(2-ethyl butyrate), dibutyl sebacate, dioctyl azelate, and triethylhexyl phosphate, which are generally used as plasticizers for resins. The amount of the plasticizer can be varied over a wide range according, for example, to the type of the resin and the type of the plasticizer. Generally, its amount is at most 150 parts by weight, preferably up to 100 parts by weight, per 100 parts by weight of the resin. The optimum amount of the plasticizer is not more than 80 parts by weight per 100 parts by weight of the resin.

Examples of fillers are fine powders of calcium oxide, magnesium oxide, sodium carbonate, potassium carbonate, strontium carbonate, zinc oxide, titanium oxide, barium sulfate, lithopone, basic magnesium carbonate, calcium carbonate, silica, and kaolin. They may be used either alone or as mixtures of two or more.

The amount of the filler is not critical, and can be varied over a wide range according to the type of the resin, the type of the filler, etc. Generally, the amount is up to 1000 parts by weight, preferably not more than 500 parts by weight, more preferably up to 200 parts by weight.

The metal-containing resin layer having the aforementioned composition may be laminated to the semiconductive resin layer (A) of an electric discharge recording material as a bonded layer, or a separate independent layer to be superimposed in a film or sheet form on the semi-conductive resin layer (A) of the recording material. The thickness of the metal-containing resin layer is not critical, and can be varied over a wide range. Generally, the thickness is preferably at least 3 microns. If the thickness of the non-recording layer is too large, the amount of electricity consumed increases. Hence, the thickness of the non-record layer is advantageously less than about 100 microns, usually 5 to 60 microns. More advantageously, satisfactory improving effects can be obtained with a thickness of about 10 to 40 microns.

The metal-containing resin layer can be applied directly to one surface of the semiconductive resin layer (A) in the electric discharge recording material. It is applied in the form of a solution or suspension in a solvent capable of dissolving the resin, for example ketones such as cyclohexanone or acetone, alcohols such as ethyl alcohol or propyl alcohol, ethers such as tetrahydrofuran or dioxane, halogenated hydrocarbons such as tetrachloroethane or chlorobenzene, dimethyl formamide, or water. Or it may also be applied as a melt. Alternatively the metal-containing resin layer may be formed into a sheet or film by known methods such as melt extrusion, solution casting, emulsion casting, or calendering, and bonded to the surface of the semi-conductive resin layer (A) of the electric discharge recording material.

In the preparation of a metal-containing resin layers, the amount of a metal powder required to achieve the desired volume resistance differs according to the method of fabrication. For example, when the layer is fabricated by casting, the amount of the metal per 100 parts by weight of the resin is 30 to 80 parts by weight for aluminum, 80 to 200 parts by weight for copper, 100 to 200 parts by weight for iron, and 250 to 600 parts by weight for zinc. In melt-shaping using a roll, the suitable amount of the metal is 200 to 600 parts by weight for copper, and 400 to 800 parts by weight for zinc, per 100 parts by weight of the resin.

Semiconductive resin layer (A)

The semiconductive resin layer (A) is laminated to one surface of the metal-containing resin layer (B), and is broken by discharge at the time of electric recording.

The semiconductive resin layer (A) has a surface resistance of more than 1 ohm to less than $10^5$ ohms, preferably $10^2$ to $10^5$ ohms, more preferably $10^3$ to $10^4$ ohms, and advantageously, has a volume resistance of not more than $10^3$ ohms-cm, preferably 1 to $10^3$ ohms-cm.

The semiconductive resin layer (A) can be formed by dispersing a conductivity-imparting agent in a resin matrix.

The resin matrix forming a substrate for the semiconductive resin layer (A) may be chosen from those which have been described hereinabove about the metal containing resin. The thermoplastic resins are especially suitable, and polyethylene, polypropylene, polyvinyl chloride, a vinylchloride-ethylene copolymer, cellulose acetate and polyvinyl acetal are used advantageously. As needed, the resin may contain additives of the types described hereinabove such as plasticizers and fillers in the amounts described.

When a filler having a different conductivity from the conductivity-imparting agent, generally having a lower conductivity than the conductivity-imparting agent, is included in the semiconductive resin layer (A), the breakdown of the semiconductive resin layer (A) by electric discharging occurs more sharply, and a recorded image which is clearer and has a higher contrast can be obtained. Suitable fillers of this kind are fine powders of inorganic substances such as magnesium oxide, calcium oxide, sodium carbonate, potassium carbonate, strontium carbonate, titanium oxide, barium sulfate, lithopone, basic magnesium carbonate, calcium carbonate, silica, kaolin clay, and zinc oxide. They can be used singly or in combination with one another. Of these, titanium oxide and calcium carbonate are especially suitable. The filler should have as uniform a particle diameter as possible. The average particle diameter of the filler is generally 10 microns at most, preferably not more than 5 microns, more preferably 3 to 0.1 microns. The amount of the filler can be varied over a wide range according to the type of the resin, etc. The suitable amount is generally 10 to 1,000 parts by weight, preferably 10 to 300 parts by weight, more preferably 50 to 200 parts by weight, per 100 parts by weight of the resin.

The conductivity-imparting agent to be dispersed in the resin to impart semiconductivity may be any material which has conductivity and gives the surface resistance and volume resistance described above to the resin layer. Generally, suitable conductivity-imparting agents have a specific resistance, measured under a pressure of 50 kg/cm$^2$, of not more than $10^6$ ohms-cm. Examples of such a conductivity-imparting agent include carbon blacks and graphite; metals such as gold, silver, nickel, molybdenum, tin, copper, aluminum, iron, and copper coated with silver; conductive zinc oxide (zinc oxide doped with 0.03 to 2.0%, by weight, preferably 0.05 to 1.0% by weight, based on the zinc oxide, of a different metal such as aluminum, gallium, germanium, indium, tin, antimony or iron); conductive metal-containing compounds such as cuprous iodide, stannic oxide, reduced titanium oxide, ferric oxide, and metastannic acid, and zeolites. Of these, carbon blacks, silver, nickel, cuprous iodide, conductive zinc oxide are preferred, and carbon blacks and conductive zinc oxide are more preferred. The carbon blacks which also act as a coloring agent are most preferred.

Carbon blacks differ somewhat in conductivity according to the method of production. Generally, acetylene black, furnace black, channel black, and thermal black can be used.

The conductivity-imparting agent is dispersed usually in the form of a fine powder in the resin. The average particle diameter of the conductivity-imparting agent is 10 microns at most, preferably not more than 5 microns, especially preferably 2 to 0.005 microns. When a metal powder is used as the conductivity-imparting agent, the shape of the metal powder is not particularly limited so long as it has a particle diameter in the above-specified range. A resin sheet having the metal powder dispersed therein tends to be electrically anisotropic if its particle diameter exceeds 0.2 micron. Hence, the particle size of a metal powder used as a conductivity-imparting agent for the semiconductive resin layer (A) or the conductive layer (C) to be described hereinbelow should be at most 0.5 micron, preferably not more than 0.2 micron, more preferably 0.15 to 0.04 micron.

The amount of the conductivity-imparting agent to be added to the resin can be varied over a very wide range according to the conductivity of the conductivity-imparting agent, etc. The amount is that sufficient to adjust the surface resistance and volume resistance of the semiconductive resin layer (A) to the above-mentioned ranges. The aforesaid conductivity-imparting agents may be used singly or in combination with one another. For example, carbon blacks are incorporated generally in an amount of 50 to 500 parts by weight, preferably 50 to 300 parts by weight more preferably 50 to 200 parts by wwight, per 100 parts by weight of the resin.

The other conductivity-imparting agents are used generally in an amount of 1 to 1,000 parts by weight, preferably 5 to 500 parts by weight, per 100 parts by weight of the resin.

When the above semiconductive resin layer is formed into the electric recording material of this invention and is subjected to electric recording, it undergoes breakdown by discharge together with the conductive coating layer (C) and the protective covering layer (D) (if it is present) described hereinbelow, and is transferred to a recording sheet such as paper or plastic films to form a recorded image. Accordingly, a coloring substance may be incorporated in the semiconductive resin layer to give a transferred recorded image which is colored in various colors.

Known inorganic or organic pigments and dyes can be used as such coloring agents. Examples of pigments other than carbon black include inorganic pigments such as nickel yellow, titanium yellow, cadmium yellow, zinc yellow, ochre, cadmium red, prussian blue, ultramarine blue, zinc white, lead sulfate, lithopone, titanium oxide, black iron oxide, chrome orange, chrome vermilion, red iron oxide, red lead and vermilion; and organic pigments of the phthalocyanine, quinacridone and benzidine series such as aniline black, naphthol yellow S, Hanza yellow 10G, benzidine yellow, Permanent Yellow, Permanent Orange, Benzidine Orange G, Indanthrene Brilliant Orange GK, Permanent Red 4R, Brilliant Fast Scarlet, Permanent Red F2R, Lake Red C, Cinquasia Red Y (Dup) (C.I. 46500), Permanent Pink E (FH) [Quido Magenta RV 6803 (HAR)], and Phthalocyanine Blue (C.I. Pigment Blue 15).

Examples of useful dyes are azoic dyes, anthraquinonic dyes, thioindigo dyes, quinoline dyes, and indanthrene dyes.

The pigments and dyes described are used either alone or in combination according to the color desired to be formed on a receptor sheet.

The amount of the coloring agent may be varied widely depending upon the color, density, etc. desired of the transferred recorded image. Generally, it can be added in an amount of 1 to 1,000 parts by weight, preferably 3 to 500 parts by weight, per 100 parts by weight of the resin matrix.

The semiconductive resin layer may further contain a resin having a lower melting point than the resin matrix constituting the semiconductive resin layer. The lower-melting resin can generally have a melting point of 30° to 100° C., preferably 40° to 80° C. As a result of adding the lower-melting resin, the lower-melting resin is transferred by heat simultaneously with the transfer of the resin matrix by discharge at the time of passing an electric current. Accordingly, the occurrence of offensive odors and soot at the time of recording can be drastically inhibited.

Examples of lower-melting resins which have such an effect are thermoplastic resins including low-molecular-weight polyethylene, polypropylene and an ethylene/vinyl acetate copolymer; polyethylene glycol and polypropylene glycol; and paraffin waxes and microcrystalline waxes.

The amount of the lower-melting resin is not critical. Generally, the amount is desirably in the range of 100 to 500 parts by weight, preferably 120 to 250 parts by weight, per 100 parts by weight of the resin matrix.

The thickness of the semiconductive resin layer (A) is not critical, and can be varied over a wide range according to the uses of the final product, etc. Generally, its thickness is at least 1 micron, preferably 2 to 50 microns, more preferably 5 to 25 microns.

Electrically conductive covering layer (C)

According to the present invention, the conductive layer (C) is laminated on the other surface of the semiconductive resin layer (A).

The conductive layer (C) plays an important role in performing electric discharge breakdown with high accuracy by converging the current flowing through the semiconductive resin layer at a point immediately downward of the electric discharge recording stylus. The conductive layer (C) has a surface resistance of not more than $10^4$ ohms, preferably not more than $5\times10^3$ ohms, more preferably $10^{-1}$ to $2\times10^3$ ohms and a volume resistance of not more than $10^2$ ohms-cm, preferably not more than 50 ohms-cm, more preferably not more than 20 ohms-cm.

The efficiency of electric recording tends to decrease if the difference between the surface resistance of the semiconductive resin layer (A) and that of the conductive covering layer (C) is too small. It is desirable therefore that the ratio of the surface resistance of the semiconductive resin layer (A) to that of the conductive covering layer (C) should generally be from 10:1 to $10^4$:1, preferably from $10^2$:1 to $10^4$:1.

The conductive layer (C) having such resistance characteristics may be a conductive resin layer comprising a thermoplastic or thermosetting resin and a conductivity-imparting agent dispersed in it, a vacuum-deposited metal layer, or a metal foil layer.

The thermoplastic or thermosetting resin that can be used in the conductive resin layer can also be selected from those described hereinabove about the metal-containing resin layer. Of these, the thermoplastic resins, especially polyethylene, cellulose acetate and polyvinyl acetal, are used advantageously. The conductivity-imparting agent to be dispersed in the resin may be chosen from those described above about the semiconductive resin layer. Carbon blacks and metal powders are especially suitable.

The conductivity-imparting agents are added in amounts which will cause the resin layer to have the electrical resistance characteristics described above. The amounts vary greatly according to the type of the conductivity-imparting agent. For example, carbon blacks are used in an amount of generally at least 10 parts by weight, preferably 20 to 200 parts by weight, more preferably 30 to 100 parts by weight; the other conductivity-imparting agents, especially metal powders, are used in an amount of at least 50 parts by weight, preferably 100 to 600 parts by weight, more preferably 150 to 400 parts by weight, both per 100 parts by weight of the resin.

As needed the conductive resin layer may contain the aforesaid additives such as plasticizers and fillers in the amounts stated.

The thickness of the conductive resin layer is not critical, and can be varied widely according to the uses of the final products, etc. Generally, it is at least 1 micron, preferably 3 to 50 microns, more preferably 5 to 20 microns.

The conductive layer (C) may be a vacuum-deposited metal layer. Specific examples of the metal are aluminum, zinc, copper, nickel, molybdenum, silver and gold. Of these, aluminum is most suitable.

The thickness of the vacuum-deposited metal layer is neither limited strictly. Generally, it is at least 4 millimicrons, preferably 10 to 300 millimicrons, more preferably 20 to 100 millimicrons. By an ordinary vacuum-depositing method or ion-sputtering method for metals, it can be applied to one surface of the semiconductive resin layer (A).

The conductive layer (C) may also be a thin metal foil, for example an aluminum foil. It can be applied to one surface of the semiconductive resin layer (A) by such means as bonding or plating.

When the composite discharge recording material is intended for use in electric discharge transfer recording, at least one of the semiconductive resin layer (A) and the conductive resin layer (C) may contain a coloring substance. Useful coloring substances are carbon blacks, inorganic or organic pigments, and dyes.

Carbon black has superior conductivity and acts both as a coloring substance and a conductivity-imparting agent as stated above. Thus, when the semiconductive resin layer or the conductive resin layer already contains carbon black as a conductivity-imparting agent, it is not necessary to add a coloring substance further. The inclusion of the other suitable coloring substances described above is of course permissible.

The amount of the pigment or dye can be varied over a wide range according to the type, color intensity, etc. of the coloring substance. Generally, it is at least 1 part by weight, preferably 2 to 1,000 parts by weight, more preferably 3 to 500 parts by weight, per 100 parts by weight of the resin.

When the pigment or dye is to be incorporated in both of the semiconductive resin layer (A) and the conductive resin layer (C), it is desirable that pigments or dyes be of an identical color or have colors of the same series.

The aforesaid metal-containing resin layer, semiconductive resin layer and conductive covering resin layer can be laminated by known methods, for example a melt-extrusion method, a melt-coating method, a melt-calendering method, a solution casting method, an emulsion coating method or combinations of these methods to form the composite electric discharge recording material of this invention.

When the conductive covering layer is to be formed of a thin metal film, the thin metal film may be deposited by vacuum deposition, ion sputtering, plating, etc. on the surface of the semiconductive resin layer of a laminate composed of the metal-containing resin layer and the semiconductive resin layer obtained by the method described hereinabove. Or it is possible to deposit the thin metal film on one surface of the semiconductive resin layer, and then laminate the metal-containing resin layer to the other surface of the semiconductive resin layer by the method described hereinabove.

The resulting record material composed of the metal-containing resin layer (B), the semiconductive resin layer (A) and the conductive covering layer (C) may be directly used in the applications described hereinbelow. As required, however, the protective covering resin layer may (D) may be provided on the surface of the conductive covering layer (C).

Protective covering resin layer (D)

This protective covering resin layer can also be composed of a resin matrix and a conductivity-imparting agent dispersed therein. The materials described hereinabove with regard to the semiconductive resin layer (A) may be directly used as the resin matrix and the conductivity-imparting agent in the protective covering layer. Carbon blacks are especially suitable as the conductivity-imparting agent.

The protective covering resin layer is to be broken down together with the semiconductive resin layer (A) and the conductive covering layer (C) in performing electric recording by using the electric recording material of this invention. It serves to protect the conductive covering layer (C) and increase the printing durability of the electric recording material of this invention. Advantageously, the protective covering resin layer has a thickness of generally not more than 10 microns, preferably not more than 5 microns, and more preferably not more than 4 microns.

It is important that the protective covering resin layer (D) should have a higher surface resistance than the conductive covering layer (C). Desirably, the protective layer (D) generally has a surface resistance of $10^2$ to $10^{16}$ ohms. The suitable ratio of the surface resistance of the protective layer (D) to that of the conductive covering layer (C) is $10^2$:1 or higher.

Generally, the protective layer (D) should desirably have a volume resistance of not less than $10^2$ ohms-cm.

The conductivity-imparting agent can be incorporated in the protective covering resin layer in such proportions that the surface resistance and volume resistance of the protective covering resin layer are within the above-specified ranges. Generally, the amount of the conductive-imparting agent is 1 to 1,500 parts by weight, preferably 5 to 500 parts by weight, per 100 parts by weight of the resin matrix. The average particle diameter of the conductivity-imparting agent is generally not more than 5 microns, preferably not more than 2 microns.

Plasticizers, fillers, coloring agents, etc. may be incorporated into the protective covering resin layer as in the semiconductive resin layer (A) and the conductive covering layer (C). It is especially preferred to incorporate inorganic fillers, such as those exemplified hereinabove with regard to the semiconductive resin layer (A), also into the protective covering resin layer. The inorganic fillers used should desirably have an average particle diameter of not more than 5 microns, preferably not more than 2 microns. The amount of the inorganic filler is generally 10 to 1000 parts by weight, preferably 10 to 200 parts by weight, per 100 parts by weight of the resin matrix.

The protective layer (D) can be formed on the surface of the conductive covering layer (C) by a known method, for example solution casting, emulsion casting, melt coating, and melt calendering.

By providing the protective layer in the electric recording material of this invention, the printing durability of the recording material increases, and recorded images of high optical reflection density can also be obtained in repeated cycles of electric recording. Moreover, the conductive covering layer is not likely to be injured during storage or transportation, and the electric recording material is easy to handle.

Composite electrical recording material of this invention

The composite electric discharge recording material of this invention described above is useful as an electric discharge transfer recording material or an electric stencil master sheet.

For use as an electric discharge transfer recording material, a consolidated laminate composed of the semiconductive resin layer (A), the metal-containing resin layer (B) and the conductive layer (C) and optionally the protective covering resin layer (D) is formed, and superimposed on a receptor sheet for electric discharge transfer recording such as pulp paper, a synthetic paper-like sheet or a plastic sheet so that the conductive layer (C) or the protective layer (D) contacts the receptor sheet. When electric discharge recording is performed by a discharge recording stylus in accordance with an ordinary method from the side of the metal-containing resin layer (B), the semiconductive resin layer (A) and the conductive layer (C) and if present, also the protective layer (D) are simultaneously broken by electric discharging, and the broken pieces are transferred to the receptor sheet and fixed thereto, thus achieving transfer recording.

Transfer recording using this composite electric discharge recording material can be easily performed continuously in an automated system.

Needless to say, the composite electric discharge recording material of this invention can be processed to any desired width or length according to its use.

The composite electric discharge recording material of this invention can also be used as an electrostencil master sheet. In this case, the semiconductive resin layer (A) and the conductive layer (C) and optionally, the protective layer (D) are formed in a unitary laminate structure, and the metal powder-containing resin layer (B) is strippably laminated by its own tackiness or by the aid of a temporary adhesive to that surface of the semiconductive resin layer (A) which is opposite to the surface on which the conductive layer (C) is laminated. When electric discharge breakdown is performed in accordance with a customary manner from the side of the metal powder-containing resin layer (B), a pattern is correspondingly cut in the laminate of the seniconductive resin layer (A) and the conductive layer (C) and if present, the protective layer (D) also. After the end of electric discharge recording, the metal powder-containing resin layer (B) is removed from the composite electric discharge recording material, and a sheet consisting of the laminate of the semiconductive resin layer (A) and the conductive layer (C) can be utilized as a master sheet for duplication.

The greatest technical advantage of the electric recording material of this invention is that it permits electric recording at much lower voltages, for example at not more than 120 V, preferably 20 to 120 V, than conventional discharge recording materials. Thus, the electric recording material of this invention can be applied to a multi-stylus electric recording system, and can increase the speed of recording.

Thus, according to this invention, there is also provided a method for electrical recording, which comprises contacting a receptor sheet with one surface of an electric recording material, said electric recording material comprising (A) a semiconductive resin layer comprising a resin matrix and a conductivity-imparting agent dispersed therein and having a surface resistance of more than 1 ohm to less than $10^5$ ohms, (B) a metal-containing resin layer comprising a resin matrix and 5 to 60% by volume of a metal powder dispersed therein and having a surface resistance of $10^5$ to $10^{16}$ ohms, said metal-containing layer being laminated to one surface of said semiconductive resin layer (A), (C) an electrically conductive covering layer having a surface resistance not exceeding $10^4$ ohms and being lower than that of the semiconductive resin layer (A), said covering layer being laminated to the other surface of said resin layer (A), and (D) optionally, a protective covering resin layer having a higher surface resistance than that of said covering layer (C) and a thickness of not more than 10 microns, said protective covering layer being laminated to said conductive covering layer (C); contacting a recording stylus with the other surface of the electric recording material; and applying a voltage of not more than 120 V, preferably 20 V to 120 V to the recording material through said recording stylus, thereby breaking down said semiconductive resin layer (A) and conductive covering layer (C) of said recording material and also said protective layer (D) if it is present, and thus transferring the broken layers to said receptor sheet.

In the above method, electric recording can be performed while moving the electric recording material and the receptor sheet in the same direction. The moving speeds of the recording material and the receptor sheet may be different from each other, and the moving speed of the recording material may be larger than that of the receptor sheet, provided that the moving speed of the recording material does not exceed 1,000 times that of the receptor sheet. Alternatively, the electrical recording may be performed while moving the recording material and the receptor sheet in different directions. In this embodiment, it is convenient to set the moving direction of the receptor sheet at right angles to the moving direction of the recording material.

The operation itself of the electric recording method of this invention is known, and is described in detail, for example, in British patent specification No. 1,545,726 (corresponding to U.S. Pat. No. 4,163,075). This British patent specification is hereby cited in lieu of a detailed description of the operation of the method of this invention.

In electric discharge recording, the semiconductive resin layer and the conductive layer of the composite electric discharge recording material are broken down, but the metal-containing resin layer is not broken because of its electric anisotropy and remains substantially unchanged. Accordingly, the dissipation of the offensive odor issued at the time of electric discharge breakdown is inhibited, and soot or a coloring substance such as carbon black is prevented from scattering and adhering to the discharge recording stylus. The troublesome inspection and maintenance of the discharge recording stylus can be markedly reduced, and recording can be performed with high reliability.

The use of the composite electric discharge recording material can afford a sharp recorded image, and in electric discharge transfer recording, a transfer recorded image having a high optical reflection density, a natural appearance and a soft tone can be obtained.

The composite electric discharge recording material of this invention can be used repeatedly.

In the manufacture of the recording material of this invention, use of a vacuum depositing or ion sputtering technique can afford the conductive covering layer (C) very easily and in a very small thickness. Accordingly, the conductive covering layer can be easily broken down upon the application of voltage to give a highly reliable clear recording with high sensitivity.

When electric recording is carried out by an electric transfer recording system using the electric recording material of this invention, the semiconductive resin layer, the conductive covering layer and the protective layer (if present) are broken down and transferred to a receptor sheet to form a recorded image thereon. Accordingly, recording in various colors is possible by changing the compositions of the semiconductive resin layer, the conductive covering layer and the protective covering layer (the conductivity-imparting agent, coloring material, etc.).

Recorded images obtained by using the recording material of this invention in which the semiconductive resin layer contains an inorganic filler are clearer than those obtained with a recording material not containing the inorganic filler, and thus the resolving power of the recording material is increased.

The metal-containing resin layer used in this invention does not develop penetration holes nor change otherwise during electric recording, and therefore, can be used in the same way as in the case of pressure-sensitive receptor sheets such as carbon paper. For example, by contacting the electric recording material with the surface of a receptor sheet and performing electric recording while moving the two in the same direction, a recorded image can be obtained continuously in a simple manner. If the speed of moving of the receptor sheet is made faster than that of the recording material, electrical recording can be carried out more economically.

It is possible to make the electric recording material in ribbon form and using it for discharge recording while setting it as in a typewriter.

The composite electric discharge recording material of this invention can be conveniently used in facsimile systems, terminal recording devices in electronic computers, automatic recording devices in automatic measuring instrumenents, various types of printers, etc.

The following Examples illustrate the present invention in more detail. All parts and percentages are by weight unless otherwise specified.

EXAMPLE 1

(1-1)

Vinyl chloride/vinyl acetate copolymer (the degree of polymerization 650, vinyl acetate content 13%): 100 parts
Electrolytic copper powder (average particle diameter 1.4 microns): 130 parts
Ethyl acetate: 200 parts
Toluene: 200 parts The above ingredients were mixed to form a dispersion. The dispersion was cast on a glass plate, and dried to form a metal-containing resin sheet having a thickness of 25 microns. The amount of the electrolytic copper powder was 16.9% by volume of the sheet. The sheet had a surface resistance of $0.8\times10^{13}$ ohms, and a volume resistance of $1.4\times10^{2}$ ohms-cm.

(1-2)

Butyral resin (degree of polymerization 1700, degree of butyralization 66%): 100 parts
Thermal black: 160 parts
Acetylene black: 60 parts
Precipitated calcium carbonate (average particle diameter 1.7 microns): 100 parts
Ethyl alcohol: 1000 parts The above ingredients were mixed to form a dispersion. The dispersion was coated on the metal-containing resin sheet and dried to form a semiconductive resin layer having a thickness of 15 microns to form a composite sheet having a thickness of 40 microns. The semiconductive resin layer had a surface resistance of $0.8\times10^{4}$ ohms, and a volume resistance of 5 ohms-cm.

(1-3)

Butyral resin (the degree of polymerization 1700, the degree of 100 parts butyralization 66%):
Acetylene black: 100 parts
Ethyl alcohol: 1000 parts The above ingredients were mixed to form a dispersion. The dispersion was coated on the semiconductive resin layer having a thickness of 4 microns to form an electric recording material. The conductive covering layer had a surface resistance of $0.2\times10^{3}$ ohms, and a volume resistance of 0.5 ohm-cm.

(1-4)

The resulting electrical recording material was fed into a suitable automatic electrostencil master processing machine. High-quality paper was brought into contact with the undersurface of the conductive covering layer, and a recording stylus was brought into contact with the surface of the metal-containing resin layer. A dc voltage of 90 V was applied to the electric recording material, and electric recording was performed while maintaining the scanning density at about 6 lines/mm. No scattering of soot or carbon black was noted, and scarcely any offensive odor was issued. Moreover, no penetration hole formed in the metal-containing resin sheet, and a clear black image was obtained on the high-quality paper. The density of the image was 0.66.

COMPARATIVE EXAMPLE 1

Butyral resin the degree of polymerization 1700, the degree of butyralization 66%): 100 parts
Thermal black: 160 parts
Precipitated calcium carbonate (average particle diameter 1.7 microns): 100 parts
Ethyl alcohol: 1000 parts The above ingredients were mixed to form a dispersion. The dispersion was coated on the metal-containing resin sheet obtained in Example 1, (1-1), and dried to form a semi-conductive resin layer having a thickness of 15 microns and to obtain a composite sheet having a thickness of 40 microns. The semiconductive resin layer had a surface resistance of $0.9\times10^{11}$ ohms and a volume resistance of $2\times10^{8}$ ohms-cm.

On the semiconductive resin layer of the composite sheet a conductive covering layer having a thickness of 4 microns obtained in Example 1, (1-3) was formed in the same way as in Example 1 to obtain an electric recording material having a thickness of 44 microns. The conductive covering layer had a surface resistance of $0.2\times10^{3}$ ohms and a volume resistance of 0.5 ohm-cm.

Electric recording was performed in the same way as in Example 1, (1-4) using the resulting electric recording material. No scattering of soot or carbon black occurred, and scarcely any offensive odor was issued. Furthermore, no penetration hole formed on the metal-containing resin sheet, and a black image was obtained on the high-quality paper. However, the image was vague, and had an image density of only 0.20.

EXAMPLE 2

Aluminum was vacuum-deposited at $3\times10^{-5}$ Torr on the seniconductive resin layer of the composite sheet obtained in Example 1, (1-2) to form a conductive covering layer having a thickness of 400 A. Thus, an electrical recording material was obtained. The conductive covering layer had a surface resistance of 5 ohms.

Electric recording was performed in the same way as in Example 1, (1-4) except that a dc voltage of 90 V or 60 V was applied to the resulting electric recording material. No scattering of soot or carbon black occurred, and scarcely any offensive odor was issued. Moreover, no penetration hole formed in the metal-containing resin layer. A clear black image was obtained on high-quality paper. The density of the image was 0.75 when a dc voltage of 60 V was applied, and 0.85 when a dc voltage of 90 V was applied.

COMPARATIVE EXAMPLE 2

Butyral resin (the degree of polymerization, the degree of butyralization 66%): 100 parts
Thermal black: 160 parts
Precipitated calcium carbonate (average particle diameter 1.7 microns): 100 parts
Ethyl alcohol: 1000 parts The above ingredients were mixed to form a dispersion. The dispersion was coated on the metal-containing resin sheet obtained in Example 1, (1-1), and dried to form a semiconductive resin layer having a thickness of 10 microns and to form a composite sheet having a thickness of 35 microns. The semiconductive resin layer had a surface resistance of $0.9\times10^{11}$ ohms and a volume resistance of $2\times10^{8}$ ohms-cm. A vacuum-deposited aluminum layer having a thickness of 400 A was formed on the semiconductive resin layer of the above composite sheet in the same way as in Example 2 to obtain an electric recording material. The conductive aluminum layer had a surface resistance of 5 ohms Electric recording was performed in the same way as in Example 1, (1-4) using the resulting electric recording material. No scattering of soot or carbon black occurred, and scarcely any offensive odor was issued. Moreover, no penetration hole formed on the metal-containing resin layer. A black image having a density of 0.33 was obtained on high-quality paper.

EXAMPLE 3

Butyral resin (the degree of polymerization 1700, the degree of butyralization 66%): 100 parts
Thermal black: 160 parts
Silver powder (average particle diameter 2 microns): 250 parts
Precipitated calcium carbonate (average particle diameter 1.7 microns): 100 parts
Ethyl alcohol: 1000 parts The above ingredients were mixed to form a dispersion. The dispersion was coated on the metal-containing resin sheet obtained in Example 1, (1-1), and dried to form a semiconductive resin layer having a thickness of 15 microns and to form a composite sheet. The semiconductive resin layer had a surface resistance of $0.2\times10^{5}$ ohms and a volume resistance of $5\times10^{2}$ ohms-cm. A conductive covering layer having a thickness of 4 microns was formed on the semiconductive resin layer of the composite sheet in the same way as in Example 1, (1-3) to form an electric recording material having a thickness of 44 microns. The conductive covering layer had a surface resistance of $0.2\times10^{3}$ ohms and a volume resistance of 0.5 ohm-cm.

Electric recording was performed in the same way as in Example 1, (1-4) using the resulting electric recording material. No scattering of soot or carbon black occurred, and scarely any offensive odor was issued. Moreover, no penetration hole formed on the metal-containing resin sheet, and a clear black image was formed on high-quality of 0.65.

EXAMPLES 4 to 7

(4-1)

Vinyl chloride/vinyl acetate copolymer (the degree of polymerization 650, the vinyl acetate content 13%):
Electrolytic copper powder (average particle diameter 1.4 microns): 130 parts Ethyl acetate: 200 parts
Toluene: 200 parts The above ingredients were mixed to form a dispersion. The dispersion was cast on a glass plate, and dried to form a metal-containing resin sheet having a thickness of 20 microns. The volume of the electrolytic copper powder was 16.9% of the sheet. The sheet had a surface resistance of $0.8\times10^{13}$ ohms and a volume resistance of $1.4\times10^{2}$.

(4-2)

Butyral resin (the degree of polymerization 1700, the degree of butyralization 65%): 100 parts
Thermal black: 160 parts
Acetylene black: 40 parts
Ethyl alcohol: 1400 parts The above ingredients were mixed to form a dispersion. The dispersion was coated on the sheet obtained in (4-1), and dried to form a semiconductive resin layer having a thickness of 10 microns and thus to form a composite sheet having a thickness of 30 microns. The semiconductive resin layer had a surface resistance of $0.7\times10^{5}$ ohms and a volume resistance of 4 ohms-cm.

(4-3)

Aluminum was vacuum deposited at $3\times10^{-5}$ Torr on the semiconductive resin layer of the resulting composite sheet to form a conductive aluminum layer having a thickness of 400 A and to form an electric recording material A (Example 4). The conductive layer had a surface resistance of 5 ohms.

(4-4)

Butyral resin (the degree of polymerization 1700, the degree of butyralization 65%): 100 parts
Acetylene black: 80 parts
Ethyl alcohol: 1400 parts The above ingredients were mixed to form a dispersion. The dispersion was coated on the conductive layer of the electric recording material A, and dried to form a protective covering resin layer having a thickness of 3 microns, 5 microns, and 8 microns, respectively thereby to form electric recording materials B (Example 5), C (Example 6), and D (Example 7). The protective covering resin layers had a surface resistance of $2.0\times10^{3}$ ohms and a volume resistance of 2 ohms-cm.

(4-5)

Each of the electric recording materials A and B obtained was fed into a suitable automatic electrostencil master sheet processing machine. High-quality paper was brought into contact with the undersurface of the conductive covering layer or the protective covering layer, and a dc voltage of 60 V was applied. Electric recording was performed through five cycles at a scanning density of 4 lines/mm to record the same image. No scattering of soot or carbon black was noted, and scarcely any offensive odor was issued. Moreover, no penetration hole formed on the metal-containing resin layer, and clear black images were obtained on the high-quality paper. The densities of the resulting images are shown in Table 1 below.

TABLE 1

| Number of cycles of electric recording | Image density | | | | |
|---|---|---|---|---|---|
| | 1 | 2 | 3 | 4 | 5 |
| Example 4 | 0.85 | 0.55 | 0.34 | 0.26 | 0.20 |

TABLE 1-continued

| Number of cycles of electric recording | Image density | | | | |
|---|---|---|---|---|---|
| | 1 | 2 | 3 | 4 | 5 |
| Example 5 | 0.79 | 0.66 | 0.55 | 0.50 | 0.45 |

Using the recording materials C and D obtained above, electric recording was performed once in the same way as shown above. With the recording material C, a clear image having a density of 0.68 was obtained. With the recording material D, a partly vague image having a density of 0.45 was obtained.

EXAMPLES 8 TO 10 AND COMPARATIVE EXAMPLE 3

(8-1)

Butyral resin (the degree of polymerization 1700, the degree of butyralization 65%): 100 parts
Thermal black: 160 parts
Silver powder (average particle diameter 2 microns): 250 parts
Ethyl alcohol: 1400 parts The above ingredients were mixed to form a dispersion. The dispersion was coated on the metal-containing resin sheet obtained in Example 4, (4-1), and dried to form a semiconductive resin layer having a thickness of 15 microns and thus to obtain a composite sheet having a thickness of 35 microns. The semiconductive resin layer had a surface resistance of $0.2\times10^{5}$ ohms and a volume resistance of $5\times10^{2}$ ohms-cm.

Aluminum was vacuum-deposited to a thickness of 400 A on the semiconductive resin layer of the composite sheet in the same way as in Example 4, (4-3) to form a conductive covering layer. Thus, an electric recording material E (Example 8) was obtained. The conductive covering layer had a surface resistance of 5 ohms.

(8-2)

Butyral resin (the degree of polymerization 1700, the degree of butyralization 65%): 100 parts
Thermal black: 200 parts
Ethyl alcohol: 1400 parts The above ingredients were mixed to form a dispersion. The dispersion was coated on the conductive covering layer of the recording material E, and dried to form a protective layer having a thickness of 3 microns, 6 microns and 12 microns and to obtain electric recording materials F (Example 9), G (Example 10) and H (Comparative Example 3). The surface resistances of the protective covering layers were $0.8\times10^{9}$ ohms and their volume resistances were $1.0\times10^{8}$ ohms-cm.

The same image was recorded five times in the same way as in Examples 4, (4-5) using the recording materials E and F. No scattering of soot or carbon black occurred, and scarcely any offensive odor was issued. Moreover, no penetration hole formed on the metal-containing resin layer. Clear black images were obtained on high-quality paper. The densities of the resulting images are shown in Table 2.

TABLE 2

| Number of cycles of electric recording | Image density | | | | |
|---|---|---|---|---|---|
| | 1 | 2 | 3 | 4 | 5 |
| Example 8 | 0.70 | 0.36 | 0.30 | 0.24 | 0.21 |
| Example 9 | 0.66 | 0.55 | 0.42 | 0.40 | 0.37 |

Electric recording was performed once in the same way as in Example 4,(4-5) using the resulting recording materials G and H. With the recording material G, a clear image having a density of 0.49 was obtained, but with the recording material H, no image was obtained.

EXAMPLE 11

(11-1)

Vinyl chloride/vinyl acetate copolymer (the degree of polymerization 640, the vinyl acetate content 13%): 100 parts
Electrolytic copper powder (average particle diameter 1.4 microns): 130 parts
Ethyl acetate: 200 parts
Toluene: 200 parts The above ingredients were mixed to form a dispersion. The dispersion was cast on a glass plate, and dried to form a metal-containing resin sheet having a thickness of 20 microns. The volume of the electrolytic powder was 16.9% of the sheet. The sheet had a surface resistance of $0.8\times10^{13}$ ohms and a volume resistance of $1.4\times10^{2}$.

(11-2)

Butyral resin (the degree of polymerization 1700, the degree of butyralization 65%): 100 parts
Thermal black: 320 parts
Acetylene black: 120 parts
Polyethylene glycol (molecular weight 4000, average particle diameter 10 microns, melting point 61° C.): 100 parts
Polypropylene glycol (molecular weight 400): 40 parts
Precipitated calcium carbonate (average particle diameter 1.7 microns): 200 parts
Ethyl alcohol: 250 parts
Toluene: 250 parts The above ingredients were mixed to form a dispersion. The dispersion was coated on the sheet obtained in (11-1) above, and dried to form a semiconductive resin layer having a thickness of 10 microns. Thus, a composite sheet having a thickness of 30 microns was obtained. The semiconductive resin layer had a surface resistance of $1.0\times10^{3}$ ohms, and a volume resistance of 2 ohms-cm.

(11-3)

Gold was vacuum-deposited on the semiconductive resin layer of the composite sheet at $3\times10^{-5}$ Torr to form a conductive covering layer having a thickness of 400 A and thus to obtain an electric recording material. The conductive layer had a surface resistance of 1 ohm.

(11-4)

High-quality paper was brought into contact with the conductive layer of the resulting recording material, and a recording stylus was brought into contact with the metal-containing resin layer of the recording material. A dc voltage of 9 V and 12 V respectively was applied to the recording stylus for 1 second per dot, and dot printing was performed. No offensive odor was issued, and a clear black image was formed on the high-quality paper. The resulting image had a density of 0.80 in both cases.

EXAMPLE 12

(12-1)

Vinyl acetal resin (the degree of polymerization 1,750; the degree pf acetalization 67%): 100 parts
Electrolytic copper powder (average particle diameter 2 microns): 160 parts
Ethyl alcohol: 1000 parts The above ingredients were mixed to form a dispersion. The dispersion was cast on a glass plate to form a metal-containing resin sheet having a thickness of 20 microns. The sheet had a surface resistance of $2\times10^{11}$ ohms and a volume resistance of $6\times10^{2}$ ohms-cm.

(12-2)

Vinyl butyral resin (the degree of polymerization 1,700; the degree of butyralization 66%): 100 parts
Al-doped conductive zinc oxide (average particle diameter 1.0 micron; compression strength 50 kg/cm$^2$; specific resistance $10^4$ ohms-cm): 300 parts
Silver powder (average particle diameter 0.5 micron): 250 parts
Ethyl alcohol: 1000 parts The above ingredients were mixed to form a dispersion. The dispersion was coated on the sheet obtained in (12-1), and dried to form a semiconductive resin layer having a thickness of 15 microns. Thus, a composite sheet having a thickness of 35 microns was obtained. The semiconductive resin layer had a surface resistance of $3\times10^{3}$ ohms, and a volume resistance of 80 ohms-cm.

(12-3)

Vinyl butyral resin (the degree of polymerization 1,700; the degree of butyralization 66%): 100 parts
Acetylene black: 100 parts
Ethyl alcohol: 1000 parts The above ingredients were mixed to form a dispersion. The dispersion was coated on the semiconductive resin layer of the composite sheet, and dried to form a conductive covering layer having a thickness of 4 microns. Thus, an electric recording material was obtained. The conductive covering layer had a surface resistance of $0.2\times10^{3}$ ohms, and a volume resistance of 0.5 ohm-cm.

(12-4)

Electric recording was performed under the same conditions as in Example 1, (1-4) using the resulting electric recording material. No scattering of soot or carbon black occurred, and scarcely any offensive odor was issued. Moreover, no penetration hole formed in the metal-containing resin sheet. A clear black image was obtained on high-quality paper. The image had a density of 0.72.

EXAMPLE 13

(13-1)

Vinyl chloride/vinyl acetate copolymer (the degree of polymerization 650; vinyl acetate content 13%): 100 parts
Zinc powder (average particle diameter 4 microns): 450 parts
Ethyl alcohol: 1000 parts The above ingredients were mixed to form a dispersion. The dispersion was cast on a glass plate to form a metal-containing resin sheet. The sheet had a surface resistance of $4\times10^9$ ohms and a volume resistance of $6\times10^2$ ohms-cm. (13-2)

On one surface of the metal-containing resin sheet obtained in (13-1) were formed a semiconductive resin layer and a conductive covering layer in the same way as in Example 12, (12-2) and (12-3) to afford an electric recording material.

(13-3)

Electric recording was performed under the same conditions as in Example 1, (1-4) using the resulting electric recording material. No scattering of soot or carbon black occurred, and scarcely any offensive odor was issued. Moreover, no penetration hole formed in the metal-containing resin sheet. A clear black image formed on high-quality paper. The image had a density of 0.58.

EXAMPLE 14

(14-1)

Vinyl butyral resin (the degree of polymerization 1,700; the degree of butyralization 66%): 100 parts
Al-doped conductive zinc oxide (average particle diameter 1.0 micron; volume resistance $10^4$ ohms-cm; compression strength 50 kg/cm$^2$): 300 parts
Silver powder (average particle diameter 0.5 micron): 250 parts
Crystal violet: 10 parts
Ethyl alcohol: 1000 parts The above ingredients were mixed to form a dispersion. The dispersion was coated on the same metal-containing resin sheet as obtained in Example 12, (12-1) to form a semiconductive resin layer having a thickness of 15 microns. Thus, a composite sheet having a thickness of 35 microns was obtained. The semiconductive resin layer had a surface resistance of $3\times10^3$ ohms and a volume resistance of 80 ohms-cm.

(14-2)

Aluminum was vacuum deposited at $3\times10^{-5}$ Torr on the semiconductive resin layer of the composite sheet to form a conductive covering layer having a thickness of 400 A. Thus, an electric recording material was obtained. The conductive covering layer had a surface resistance of 5 ohms.

(14-3)

Electric recording was performed under the same conditions as described in Example 4, (4-4) using the resulting recording material. No scattering of soot or carbon black occurred, and scarcely any offensive odor was issued. Moreover, no penetration hole formed on the metal-containing resin sheet. A clear blue image could be formed on high-quality paper. The image had the following densities.

| Number of cycles of electric recording | 1 | 2 | 3 | 4 | 5 |
|---|---|---|---|---|---|
| Image density | 0.83 | 0.44 | 0.30 | 0.25 | 0.21 |

EXAMPLE 15

A composition of the following formulation was coated on the conductive covering layer (aluminum layer) obtained in Example 14, (14-2), and dried to form a protective covering resin layer having a thickness of 3 microns.

Vinyl butyral resin (the degree of polymerization 1,700; the degree of butyralization 66%): 100 parts
Precipitated calcium carbonate (average particle diameter 1.7 microns): 100 parts
Al-doped conductive zinc oxide (average particle diameter 1.0 micron, volume resistance $10^4$ ohms-cm; compression strength 50 kg/cm$^2$): 50 parts
Crystal violet: 10 parts
Ethyl alcohol: 1000 parts The protective covering layer had a surface resistance of $2.0\times10^{11}$ ohms and a volume resistance of $4.5\times10^9$ ohms-cm.

Electric recording was performed under the same conditions as in Example 4, (4-4) on the resulting electric recording material. No scattering of soot or carbon black occurred, and scarcely any offensive odor was issued. Moreover, no penetration hole formed in the metal-containing resin sheet. A clear blue image formed on high-quality paper. The image had the following densities.

| Number of cycles of electric recording | 1 | 2 | 3 | 4 | 5 |
|---|---|---|---|---|---|
| Image density | 0.69 | 0.53 | 0.41 | 0.37 | 0.35 |

What we claim is:

1. An electric recording material comprising
(A) a semiconductive resin layer comprising a resin matrix and a conductivity-imparting agent dispersed therein and having a surface resistance of more than 1 ohm to less than $10^5$ ohms and a volume resistance of not more than $10^3$ ohms-cm which surface resistance and volume resistance parameters are such as to render the electric recording material effective for electric recording at voltages not more than 90 V,
(B) a metal-containing resin layer comprising a resin matrix and 5 to 60% by volume of a metal powder dispersed therein and having a surface resistance of $10^5$ to $10^{16}$ ohms and a volume resistance of not more than $10^4$ ohms-cm, said metal-containing layer being laminated to one surface of said semiconductive resin layer (A), said metal powder being stable and electrically conductive and having a specific resistance of not more than $2\times10^{-4}$ ohms-cm and an average particle diameter of from 0.2 to 20 microns,
(C) an electrically conductive covering layer having a surface resistance not exceeding $10^4$ ohms and a volume resistance of not more than $10^2$ ohms-cm and being lower than that of the semiconductive resin layer (A), said covering layer being laminated to the other surface of said resin layer (A) and comprising a resin matrix and a conductivity-imparting agent dispersed therein, or a vacuum-deposited metal film or a metal foil, and
(D) optionally, a protective covering resin layer having a higher surface resistance than that of said covering layer (C), a volume resistance of not less than $10^2$ ohms-cm and a thickness of not more than 10 microns, said protective covering layer being laminated to said conductive covering layer (C).

2. The recording material of claim 1 wherein said conductivity-imparting agent is carbon black.

3. The recording material of claim 1 wherein said semiconductive resin layer (A) has a surface resistance in the range of $10^2$ to $10^5$ ohms.

4. The recording material of claim 1 wherein said semiconductive resin layer (A) further comprises an inorganic filler.

5. The recording material of claim 4 wherein the amount of the inorganic filler is 10 to 1000 parts by weight per 100 parts by weight of the resin matrix.

6. The recording material of claim 1 wherein said semiconductive resin layer (A) further comprises a thermoplastic resin having a lower melting point than the resin matrix.

7. The recording material of claim 6 wherein said lower-melting thermoplastic resin has a melting point in the range of 30° to 100° C.

8. The recording material of claim 6 wherein the amount of the lower-melting thermoplastic resin is 100 to 500 parts by weight per 100 parts by weight of the resin matrix.

9. The recording material of claim 1 wherein said semiconductive resin layer (A) has a thickness in the range of 1 to 70 microns.

10. The recording material of claim 1 wherein the metal-containing resin layer (B) has a surface resistance in the range of $10^9$ to $10^{14}$ ohms.

11. The recording material of claim 1 wherein said metal-containing resin layer (B) has a thickness in the range of 5 to 7 microns.

12. The recording material of claim 1 wherein said vacuum-deposited metal film is a vacuum-deposited aluminum film.

13. The recording material of claim 1 wherein the ratio of the surface resistance of the semiconductive resin layer (A) to that of the conductive covering layer (C) is from 10:1 to $10^4$:1.

14. The recording material of claim 1 wherein said conductive covering layer (C) has a thickness in the range of 1 to 50 microns.

15. The recording material of claim 1 wherein said protective covering layer (D) comprises a resin matrix and a conductivity-imparting agent dispersed therein.

16. The recording material of claim 15 wherein said conductivity-imparting agent is carbon black.

17. The recording material of claim 1 wherein said protective covering layer (D) has a thickness of not more than 5 microns.

18. The recording material of claim 1 wherein the ratio of the surface resistance of said protective covering layer (D) to that of the said conductive covering layer (C) is $10^2$:1 or higher.

19. The recording material of claim 1 wherein said protective covering layer (D) has a surface resistance in the range of $10^2$ to $10^{16}$.

20. The recording material of claim 1 wherein at least one of the semiconductive resin layer (A), the conductive covering resin layer (C) and optionally the protective covering resin layer (D) contains a coloring substance.

21. The recording material of claim 20 wherein the coloring substance is selected from the group consisting of carbon blacks, organic and inorganic pigments, and dyes.

22. An electric recording material according to claim 1 in which the surface resistance of the semiconductive resin layer is $10^3$ to $10^4$ ohms.

* * * * *